United States Patent
Li et al.

(10) Patent No.: US 10,407,523 B2
(45) Date of Patent: Sep. 10, 2019

(54) CONTINUOUS PROCESS FOR PREPARATION OF HIGH HEAT RESISTANCE COPOLYMERS

(71) Applicant: SABIC GLOBAL TECHNOLOGIES B.V., Bergen op Zoom (NL)

(72) Inventors: Dejin Li, Newburgh, IN (US); George H. Flowers, Ocean Springs, MS (US); Shripathy Vilasagar, Parkersburg, WV (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 24 days.

(21) Appl. No.: 15/552,650

(22) PCT Filed: Feb. 25, 2016

(86) PCT No.: PCT/EP2016/053979
§ 371 (c)(1),
(2) Date: Aug. 22, 2017

(87) PCT Pub. No.: WO2016/135240
PCT Pub. Date: Sep. 1, 2016

(65) Prior Publication Data
US 2018/0037685 A1    Feb. 8, 2018

Related U.S. Application Data

(60) Provisional application No. 62/121,950, filed on Feb. 27, 2015.

(51) Int. Cl.
| | | |
|---|---|---|
| *C08F 212/12* | (2006.01) |
| *C08F 2/02* | (2006.01) |
| *C08F 6/04* | (2006.01) |
| *C08J 11/06* | (2006.01) |
| *C08F 6/00* | (2006.01) |

(52) U.S. Cl.
CPC .............. *C08F 212/12* (2013.01); *C08F 2/02* (2013.01); *C08F 6/003* (2013.01); *C08F 6/04* (2013.01); *C08J 11/06* (2013.01)

(58) Field of Classification Search
CPC ........ C08F 212/12; C08F 6/0003; C08F 2/02; C08F 6/04; C08J 11/06
See application file for complete search history.

(56) References Cited

U.S. PATENT DOCUMENTS

| | | |
|---|---|---|
| 3,268,625 A | 8/1966 | Jones et al. |
| 4,294,946 A | 10/1981 | Minematsu et al. |
| 4,414,370 A * | 11/1983 | Hamielec .................. C08F 2/02 526/209 |
| 4,795,780 A | 1/1989 | Wingler et al. |
| 4,874,829 A | 10/1989 | Schwier et al. |
| 5,459,215 A | 10/1995 | Lee et al. |
| 6,593,424 B2 | 7/2003 | Lee et al. |
| 9,458,313 B2 | 10/2016 | Seo et al. |

OTHER PUBLICATIONS

International Search Report for International Application No. PCT/EP2016/053979; International Filing Date: Feb. 25, 2016; dated May 10, 2016; 5 Pages.

Written Opinion of the International Searching Authority for International Application No. PCT/EP2016/053979; International Filing Date: Feb. 25, 2016; dated May 10, 2016; 5 Pages.

* cited by examiner

*Primary Examiner* — Catherine S Branch
(74) *Attorney, Agent, or Firm* — Cantor Colburn LLP

(57) ABSTRACT

The present disclosure concerns a bulk polymerization process for the preparation of high heat performance copolymer resins with a reduced amount of oligomer byproduct. The method can comprise isolating oligomer byproduct and introducing the oligomer byproduct into the reactant mixture for the bulk polymerization process.

15 Claims, No Drawings

CONTINUOUS PROCESS FOR PREPARATION OF HIGH HEAT RESISTANCE COPOLYMERS

CROSS REFERENCE TO RELATED APPLICATIONS

This application is a 371 of International Application No. PCT/EP2016/053979, filed Feb. 25, 2016, which claims priority to U.S. application Ser. No. 62/121,950, filed Feb. 27, 2015 which are incorporated herein by reference in their entirety.

TECHNICAL FIELD

The invention concerns a polymerization process of thermoplastic resins with minimized formation of oligomers.

BACKGROUND

Thermoplastic resins can be prepared according to a number of polymerization processes such as bulk, suspension, and emulsion polymerization. These polymerization processes for the manufacture of copolymer resins can involve a variety of reagents and reactant conditions. The relative conditions of the processes can be modified to afford the desired qualities of a final resin product.

SUMMARY

Bulk polymerization processes to yield thermoplastic resins can also produce oligomers. These oligomers can be inert or reactive and thereby alter the physical properties of the product composition. To obtain a high quality final resin product, the oligomers can be removed through a devolatilization and subsequent elimination process and then typically discarded. The oligomer removal however reveals a significant decrease in resin yield. Thus, there remains a need for a bulk polymerization process that can alleviate the negative effects of oligomer formation.

Such may for example be achieved by a method comprising:
isolating a byproduct formed during a polymerization process, preferably a bulk polymerization process, for a copolymer resin; and
introducing the byproduct formed during the polymerization process to a reactant mixture of reagents for the polymerization process,
wherein the introduction of the byproduct into a reactant mixture of the polymerization process reduces the amount of a newly formed byproduct in a polymer product of the polymerization process.

Such method may contribute to an increase in total raw material efficiency; a lower quantity of virgin raw material introduced to the process may need to be removed from the process as byproducts.

In an aspect, the present disclosure relates to a polymerization process for thermoplastic resins wherein copolymerizable monomers are combined with oligomers byproducts formed by the monomers in the presence of a radical initiator and sufficiently heated in a reactor of a polymerization reaction system.

In an aspect, the present disclosure relates to a polymerization process for thermoplastic resins comprising the addition and removal of the contents of a reactor within a polymerization reactor system at a rate such that the total volume of the system undergoing reaction at any instant is constant.

In one aspect, the present disclosure relates to a method of continuous polymerization producing an alpha-methyl styrene acrylonitrile copolymer having an improved melt flow index while maintaining good high heat performance.

For example, the polymerization process may be a process for the production of a copolymer of alpha-methylstyrene and acrylonitrile, the byproduct may be an oligomer composition separated from the polymerization process.

In further aspects, the present disclosure relates to a method of continuous bulk polymerization producing a high heat, high purity copolymer with less than 2000 ppm of monomers that is free of emulsifier, and inorganic salt impurities.

In an aspect, the present disclosure relates to articles prepared from copolymer resins formed according to the methods described herein.

In various aspects, the present disclosure relates to methods of reducing the amount of oligomers formed during a bulk polymerization process. The methods disclosed herein can also be suitable for reducing the oligomers formed during other types of polymerization, such as, for example, solution polymerization.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

DETAILED DESCRIPTION

Polymerization processes are not without their shortcomings. While an emulsion polymerization process can yield polymer resins having a high glass transition temperature (Tg) with minimal yield of oligomers (less than 1%), the emulsion polymerization process can also result in significant impurities in a resin product. Bulk polymerization processes, which do not proceed through a solvent (or aqueous medium) phase, can provide comparable high heat performance resin but unfortunately yield a greater amount of oligomers in the reaction product. These oligomers can alter the physical properties of the polymerization product.

For example, when compared to a corresponding emulsion process proceeding through a heterogeneous environment, a bulk polymerization process for the production of an alpha-methylstyrene and acrylonitrile copolymer (AMSAN) can produce a greater amount of oligomers. An emulsion polymerization process can yield an AMSAN product with low oligomers and high heat performance (Tg (glass transition temperature) greater than 130° C.). The heterogeneous environment of the emulsion polymerization processes can however afford increased impurities as a result of the added surfactants and salts in the reaction system. Moreover, the AMSAN resins of emulsion polymerization processes can have a low melt flow rate (3 g/10 min at 230° C., 3.8 kg). Comparatively, the glass transition temperature of AMSAN achieved through bulk polymerization can be comparable to that achieved via emulsion polymerization (Tg up to 125° C.), but a higher melt flow rate can be achieved. Through a bulk polymerization process, no inert liquid medium is used, thus there is no need for removal of an inert liquid medium containing surfactant and salts from the system. The bulk polymerization can often proceed through a continuous polymerization process, whereas the emulsion process can require batch separations.

However, shortcomings of a bulk polymerization process can arise directly because of the nature and various properties of the process as well as its reagents. For example, because of a lack of an aqueous reaction medium, bulk polymerization processes can have a high viscosity in the reaction system. To counteract this high viscosity, the temperature of the process may need to be raised significantly higher than that of a corresponding emulsion process, although the conversion is high (e.g., greater than 60% conversion).

In further aspects, for preparation of AMSAN, properties of the reagents and reaction conditions can highlight disadvantages of a bulk polymerization process, thus requiring modifications to the process. For example, the reactivity of the reagent alpha-methyl styrene (AMS) is lower than that of styrene, and AMS has a low ceiling temperature at 66° C. Accordingly, to achieve the desired polymerization conversion without inducing depolymerization or chain scission at high temperatures, a free radical initiator can be introduced to promote polymerization at lower temperatures than SAN would require. Heat transfer can be another challenge to the bulk polymerization process for AMSAN because of the exothermic nature and high viscosity of the process as well as the low heat capacity of certain reagents (e.g., AMS). In some aspects, the considerable heat transfer can be rectified using a connected, multi-reactor series of to achieve high conversions with good process control. In other examples, the residence time of a closed reactor for a bulk polymerization process can be adjusted to improve conversion. In yet further examples, such as for the preparation of ternary copolymers using AMS, AN, and maleimide monomers, the content of the acrylonitrile reagent can be significantly increased in a closed reactor for the bulk polymerization. Here, unfortunately, the increased acrylonitrile can discolor the ultimate copolymer resin. In a final example, the reactor system and reagents can be further modified. A two reactor system at a moderate temperature of 100° C. or 110° C. incorporating peroxides can provide AMSAN via bulk polymerization at a conversion rate of 60% and a high heat performance (that is, 125° C.)

In various aspects, the above mentioned reaction conditions and modifications can be employed to achieve a desired AMSAN copolymer. These alterations however do not necessarily address the potentially problematic oligomer byproducts of a given bulk polymerization system. Typically, bulk polymerization processes can yield a desired AMSAN resin product as well as a significant amount of oligomer byproducts, or oligomers. The oligomers as described herein can refer to the lower molecular weight byproducts formed in the bulk polymerization process by two, or three, or four monomer units, which can have a molecular weight of less than 500 g/mol (500 Daltons). In various aspects, these oligomers can be apparent on a gas chromatography mass spectroscopy spectral plot, such as at retention times of from 16 minutes to 30 minutes. In further aspects, these oligomers can be inert or reactive. Reactive oligomers, such as the alpha-methyl styrene (AMS) dimer, which can function as a chain transfer agent, can ultimately alter the overall molecular weight of the resin product.

Again, the reagents of a given bulk polymerization process can themselves hamper the process. For an AMSAN bulk polymerization, the AMS reagent can prove troublesome as the functional alpha methyl group of the AMS can cause AMS to be less reactive compared to styrene in the copolymerization with acrylonitrile to form a copolymers. Indeed, is under the same conditions (i.e., temperature, monomers, monomer weight ratio, etc) the AMS can also tend to form more oligomer byproducts than a styrene polymerization counterpart providing styrene acrylonitrile (SAN). For example, a SAN bulk polymerization can have less than 1% oligomers formed by weight, while an AMSAN bulk polymerization can form greater than 3% oligomer by weight.

In many aspects, once polymerization is complete, a devolatilization and separation process configured to eliminate the undesired oligomers as well as any unreacted monomers and volatile compounds can be employed to isolate the final resin product. This process however can also significantly diminish the process yield. Moreover, considerable waste is generated because the oligomers are often discarded. Many of the oligomers generated can have high boiling points which can hinder removal of the formed oligomers during the devolatilization stage. Oligomers remaining in the resin product can also function as plasticizers thereby lowering the heat performance (i.e., Tg) and increasing melt flow.

In one aspect, the methods herein disclose a polymerization process for a high heat resistance copolymer with a reduced formation of oligomer byproduct. In an aspect, the reduction in the oligomers formed can be achieved by charging the mixture of reagents with oligomers of the copolymerizable monomers for the polymerization. In further aspects, the ratio of copolymerizable monomers can be adjusted to further reduce the amount of oligomers formed during the polymerization process.

In further aspects, the present disclosure provides a bulk polymerization process which can reduce the effect of oligomers on properties of a resin product by reducing the amount of oligomers formed. In a further aspect, after removal, the formed oligomers can be introduced into the original feedstream, or reactant mixture, of a bulk polymerization process to reduce the amount of oligomers generated throughout the reaction process. In yet further aspects, the oligomers formed in the polymerization process and removed during devolatilization can be reintroduced into the feedstream of the reactant mixture to reduce the net amount of oligomers formed in the polymerization process.

In an aspect, the polymerization process can be performed in a vessel, for example, a closed reactor, or in a series of vessels or reactors. The vessel can vary in range, from, for example, 1 liter to as large as 37800 liters (10,000 gallons). It will be understood that other vessels and/or reactors of different volumes can also be used for the polymerization process and can be easily and/or conveniently scaled for industrial manufacture or production of a desired resin product. In an example, the vessel can have a capacity of at least 3.5 kg liquid volume occupied.

In various aspects, the reaction time of the polymerization process to provide a copolymer resin such as AMSAN, for example, can be from 2 hours to 6 hours or 3 hours to 5 hours with the reaction temperature ranging from 100° C. to 145° C. or 110° C. to 135° C. in a closed reactor vessel. In an example, the temperature of the contents of the vessel can be increased by using a heating system, for example a hot oil jacket system. Other heating systems, for instance heating systems or heaters known in the related art, can also be used for changing, and/or maintaining, the temperature of the vessel. The contents of the vessel can be stirred to mix using a stirrer or agitator, for example.

A number of reagents can be used in the bulk polymerization process. The relative quantities and/or concentrations of one or more reagents for the polymerization process can be selected and varied, for instance depending on a target speed of reaction and/or a target or intended relative component composition of the intermediate product formed via the polymerization process.

In one aspect, a polymerization process for the generation of a resin polymer, such as an alpha-methyl styrene acrylonitrile (AMSAN) copolymer, can comprise introducing a feedstream of suitable reagents into a first vessel of a bulk polymerization reactor system (hereinafter, reactor system). In some aspects, the reagents can comprise suitable copolymerizable monomers, a mono- or di-functional radical initiator, and oligomers of the copolymerizable monomers. The reagents can be combined to provide a reactant mixture in the first vessel before the reactant mixture is directed into a reactor vessel, hereinafter, reactor of the reactor system. Combining of the reagents in the first vessel can occur through agitation or by stirring of the reactant mixture.

In one aspect, suitable copolymerizable monomers can be introduced with a suitable chain-transfer agent into a first vessel of a reactor system. Oligomers of the copolymerizable monomers can also be introduced into the first vessel. The monomers, oligomers, and chain transfer agent can be stirred or agitated in the first vessel to provide a homogeneous reactant mixture, then continuously pumped to the reactor vessel along with a separate stream of initiator. In one aspect, from 58 wt. % to 75 wt. % of a monovinyl aromatic monomer, from 23 wt. % to 35 wt. % of a co-polymerizable monomer, from 0.01 wt. % to 5 wt. % of oligomers, and from 0.01 wt. % to 2.0 wt. % or 0.01 wt. % to 0.5 wt. % of an organic peroxide can be combined to form a reactant mixture. The resulting reactant mixture may be heated to a temperature of from 100° C. to 145° C. or 110° C. to 135° C. to form a polymer syrup. The polymer syrup can be continuously removed from the reactor at a rate equivalent to the rate of introduction of the reactant mixture such that at any instant the volume of the reactor can be constant.

In various aspects, an appropriate monomer for the bulk polymerization process can include an unsaturated monomer. As a further example, the unsaturated monomer can comprise copolymerizable monoethylenically unsaturated monomers such as, e.g., monoethylenically unsaturated carboxylic acids such as, e.g., acrylic acid, methacrylic acid, itaconic acid, hydroxy ($C_1$-$C_{12}$) alkyl (meth)acrylate monomers such as, e.g., hydroxyethyl methacrylate; ($C_5$-$C_{12}$) cycloalkyl (meth)acrylate monomers such as e.g., cyclohexyl methacrylate; (meth)acrylamide monomers such as e.g., acrylamide and methacrylamide; maleimide monomers such as, e.g., N-alkyl maleimides, N-aryl maleimides, maleic anhydride, vinyl esters such as, e.g., vinyl acetate and vinyl propionate. As used herein, the term "($C_5$-$C_{12}$) cycloalkyl" means a cyclic alkyl substituent group having from 5 to 12 carbon atoms per group and the term "(meth) acrylamide" refers collectively to acrylamides and methacrylamides.

In further aspects, a vinyl monomer can be used. Suitable vinyl aromatic monomers include, e.g., styrene and substituted styrenes having one or more alkyl, alkoxyl, hydroxyl or halo substituent group attached to the aromatic ring, including, e.g., -methyl styrene, p-methyl styrene, vinyl toluene, vinyl xylene, trimethyl styrene, butyl styrene, chlorostyrene, dichlorostyrene, bromostyrene, p-hydroxystyrene, methoxystyrene and vinyl-substituted condensed aromatic ring structures, such as, e.g., vinyl naphthalene, vinyl anthracene, as well as mixtures of vinyl aromatic monomers. The styrene and substituted styrenes mentioned above can also have C1-C6 alkyl, chloro-, bromo, nitro-, etc. groups in the α-position of the vinyl functionality. As used herein, the term "monoethylenically unsaturated nitrile monomer" means an acyclic compound that includes a single nitrile group and a single site of ethylenic unsaturation per molecule and includes, e.g., acrylonitrile, methacrylonitrile, α-chloro acrylonitrile. In an aspect, the monomers of the present disclosure can comprise styrene or acrylonitrile, or a combination thereof.

To provide AMSAN, the copolymerizable monomers can comprise alpha-methyl styrene (AMS) and acrylonitrile. More specifically, a first vessel can be charged with from 60 wt. % to 75 wt. % of alpha-methylstyrene and from 25 wt. % to 35 wt. % of acrylonitrile.

For example, the method according to the invention may comprise:
introducing a reactant mixture into a mixing vessel of a polymerization system, the reactant mixture comprising:
  i. from 58 wt. % to 75 wt. % of alpha-methylstyrene;
  ii. from 23 wt. % to 35 wt. % of acrylonitrile, wherein the ratio of alpha-methylstyrene and acrylonitrile is ≥2.0 and ≤3.0, wherein preferably the ratio is the weight ratio;
  iii. from 0.01 wt. % to 5 wt. % of alpha methylstyrene and alpha methylstyrene-acrylonitrile oligomers; and
  iv. from 0.01 wt. % to 2.0 wt. % of a free radical initiator, wherein the combined weight percent value of all components of the reactant mixture does not exceed 100 wt. %, and wherein all weight percent values are based on the total weight of the reactant mixture;
transferring the reactant mixture to a first reactor of the polymerization system;
heating the reactant mixture to a temperature of from 100° C. to 145° C. or 110° C. to 135° C. for a residence time of from 2 hours to 6 hours or 3 hours to 5 hours to form a polymer syrup; and
directing the polymer syrup to at least a second reactor for isolation of a polymer product.

The amount of alpha-methylstyrene and alpha-methylstyrene-acrylonitrile oligomers formed in the polymer syrup may for example be 60% less than a comparative polymer syrup formed from a reactant mixture having i, ii, and iv and in the absence of iii.

In various aspects of the present disclosure, the alpha-methylstyrene and acrylonitrile can be introduced into a first vessel in an amount such that the ratio of alpha-methylstyrene to acrylonitrile (AMS:AN) is slightly above that of an azeotropic ratio. An azeotropic ratio of AMS to AN can be 70:30 by weight. According to methods disclosed herein, in various aspects, the ratio of AMS to AN can be from 3:1 to 2:1 by weight. In a preferred embodiment, the ratio of AMS to AN is above azeotropic, for example ≥2.34, such as ≥2.34 and ≤3.0, more preferably ≥2.4 and ≤2.8, even more preferably ≥2.5 and ≤2.6.

It is preferred that the ratio of alpha-methylstyrene and acrylonitrile is ≥2.34 and ≤3.0, wherein the ratio is the weight ratio.

The use of AMS to AN in such ratio may to contribute to a reduction of the oligomer formation.

In some aspects, the reactant mixture can comprise oligomers of the copolymerizable monomers. In an example, oligomer can refer to the lower molecular weight compounds possessing two, three, or four, etc., monomer units having a molecular weight of less than 500 g/mol (500 Daltons). For example, the oligomers may have a molecular weight of less than 500 g/mol. These oligomers can be apparent on a GC-MS spectral plot, such as at retention times of from 16 minutes to 30 minutes. For an AMSAN preparation, oligomers can refer to an alpha methyl styrene (AMS) dimer, acrylonitrile (AN) dimers, trimers, tetramers, and so forth of alpha methyl styrene (AMS) and acrylonitrile (AN). These oligomers can also include the respective isomers of the oligomers presented herein. In one aspect, the reactant mixture can comprise from 0.01 wt. % to 5 wt. % of the AMS/AN oligomers. In an example, oligomers can comprise 2 wt. % of the reactant mixture. In some aspects, the oligomers present in the reactant mixture can comprise oligomers removed from the resultant polymer syrup of the polymerization process.

In various further aspects, a free radical initiator can be introduced into the first vessel containing reactant mixture. Exemplary free radical initiators can include an organic peroxide compound, such as, for example, benzoyl peroxide. Other exemplary radical initiators can comprise a persulfate compound, such as, for example, potassium persulfate; an azonitrile compound such as, for example, 2,2'-azobis-2,3, 3-trimethylbutyronitrile. The free radical initiator can be present in the reactant mixture in an amount from 0.01 wt. % to 2.0 wt. % or 0.01 wt. % to 0.5 wt. %.

In various aspects, the choice of initiator can be dependent upon the residence time in the reactor and the decomposition rate, or half-life, of the initiator compound. In one example, for the preparation of AMSAN, where the residence time is from 2 hours to 6 hours or three hours to five hours, an appropriate radical initiator can be 1,1-di(tert-butylperoxy) cyclohexane, 1,1-bis(tert-butylperoxy)-2-methylcyclohexane, 1,1-bis(tert-butylperoxy)-3,3,5-trimethylcyclohexane, 2,2-bis(tert-butylperoxy)butane, 2,2-bis(4,4-tert-butylperoxycyclohexyl)propane, ditertiary butylperoxide, dicumylperoxide, tertiary butylcumyl peroxide, azobisisobutylonitrile, 2,2'-azobis(2,4-dimethyl-pentanenitrile), potasiumpersulfate. The 1,1-di(tert-butylperoxy)cyclohexane can be introduced to the reactor in an amount from 0.01 wt. % to 2.0 wt. % or 0.01 wt. % to 0.5 wt. % of the total weight of the reactant mixture. For example, 0.05 wt. % of the 1,1-di(tert-butylperoxy)cyclohexane can be added to the reactor to initiate the polymerization.

In many aspects, a chain transfer agent can be used to control the molecular weight of the formed polymer, hence control the melt flow of final plastic products. In an example, the chain transfer agent can be introduced as a component of the reactant mixture by directly adding to the monomers mixture or separately fed to the reactor. A chain transfer agent can regulate the molecular weight of polymers formed during polymerization. Appropriate chain transfer agents can include, for example, a ($C_6$-$C_{18}$) alkyl mercaptan compound such as n-octyl mercaptan, t-dodecyl mercaptan. herein the n-octyl mercaptan (NOM) can be used.

In an aspect, a solvent can also be introduced in the process at certain quantities to control the reaction mixture viscosity and facilitate the polymerization. In one example, ethylbenzene, toluene, dimethylformamide, dimethylsulfoxide, can be introduced to the reactant mixture as a solvent. For example, ethylbenzene may be used as solvent. The solvent may lower the reaction mixture or final product mixture viscosity, promotes the heat transfer, and may also provide better solubility of produced polymer in the liquid monomers/solvent system hence improve the mixture homogeneity, and promotes the polymerization, potentially reduces byproducts formation. Various quantities of the solvent may be added to support the desired viscosity.

In an aspect, the reactant mixture comprising the reagents as presented herein can be introduced to a reactor of the reactor system. The contents of the reactor can be stirred to mix and/or homogenize using a stirrer or agitator, for example. The temperature of the contents of the vessel can be increased by using a heating system, for example a hot oil jacket system. Other heating systems, for instance heating systems or heaters known in the related art, can also be used for changing, and/or maintaining, the temperature of the vessel. In various aspects, the contents of the reactor can be heated to between approximately 100° C. and 145° C. or 110° C. and 135° C. For example, the reactant mixture can be introduced into a continuously stirred-tank reactor at a temperature of 121° C.

In an embodiment, the invention may also relate to a method comprising:
  charging a reactor vessel with a feedstream of from 58 wt. % to 75 wt. % of a monovinyl aromatic monomer, from 23 wt. % to 35 wt. % of a co-polymerizable monomer, from 0.01 wt. % to 5 wt. % of oligomers, and from 0.01 wt. % to 2.0 wt. % of a di-functional organic peroxide as free-radical initiator for a residence time of from 2 hours to 6 hours or 3 hours to 5 hours at a temperature of from 100° C. to 145° C. or 110° C. to 135° C. to provide a polymer syrup, wherein the polymer syrup comprises polymer, oligomer, and unpolymerized monomer;
  withdrawing the polymer syrup from the first reactor at a rate equivalent to that of charging the feedstream into the first reactor such the total volume of the reactor vessel at any instant is constant; and
  directing the polymer syrup to an external vessel.

The continuous heating and stirring of the introduced reactant mixture can provide a polymer syrup. The polymer syrup can consist of the desired polymer (or, the final resin product) as well as oligomers, volatile compounds, and any unreacted monomers of the polymerization process. In various aspects, the reactant mixture can be introduced into the reactor at a rate such that the total volume of the system undergoing reaction at any instant is constant. That is, the reactant mixture can be charged into the reactor while the resulting polymer syrup is directed, or pumped, out of the system from a reactor outlet at the same rate. In one aspect, the reactant mixture can be continuously introduced into the reactor at a rate of 0.8 kg/hr when the reactor vessel size is 3.5 kg liquid volume. The contents of the reactor can be maintained at the desired temperature for a residence time of from 2 hours to 6 hours or three hours to five hours.

In an aspect, the polymer syrup comprising the polymer product, oligomers, volatile compounds, and unreacted monomers can be subjected to a separation process to isolate the polymer product. For example, the polymer syrup continuously pumped from the reactor can then undergo a devolatilization process. Said devolatilisation process may be conducted in an external vessel, also referred to as second reactor. Devolatilization can be achieved using an extruder or one or more flash chambers such as a flash chamber after the polymerization reaction to reduce the amount of volatile compounds. The volatile compounds typically removed can include unreacted monomers, added solvents, as well as oligomers produced during reaction. In one example, the polymer syrup can be devolatilized under a vacuum atmosphere in an extruder or a flash chamber to remove volatile compounds.

In the external vessel, the polymer syrup may for example be subjected to vacuum pressure and heat to extract volatile organic compounds, oligomers, and unpolymerized monomers from the polymer syrup to form an isolated polymer product, and the oligomers extracted may be introduced to the charging feed stream of the first reactor.

In the external vessel, it is preferred that the pressure in at least a part of the external vessel ≤30 kPa and the temperature in at least a part of the external vessel is ≥180° C. and ≤250° C. More preferably, the pressure in at least a part of the external vessel ≤20 kPa and the temperature in at least a part of the external vessel is ≥190° C. and ≤230° C.

In various aspects, devolatization can comprise extruding the resulting polymer syrup under a vacuum. In an example, for a 3.5 kg liquid volume reactor, the unreacted monomers, solvents and oligomers can be removed by a 2.54 cm (1 inch) diameter twin screw co-rotating intermeshing extruder devolatizer equipped with three vents under vacuum atmosphere, where the first vent can be at 93.3 kPa (700 mmHg), the second vent can be at 26.7 kPa (200 mmHg) and the third vent can be at 1.3 kPa (10 mmHg) pressures. The extruder temperature can be controlled by electric heating with 8 zones temperatures set at 193° C., 199° C., 199° C., 199° C., 199° C., 199° C., 215° C., 215° C. The screw speed can be at 900 rpm.

In the method according to the invention, the monovinylic aromatic monomer may for example be alpha-methylstyrene, the co-polymerizable monomer may for example be acrylonitrile, and/or the free radical initiator may comprise 1,1-di(tert-butylperoxy)cyclohexane.

The external vessel preferably comprises a devolatilization extruder or flash chamber.

In one aspect, once the volatile compounds, unreacted monomers and oligomers are removed, a high heat polymer, for example, AMSAN, can be obtained. The copolymer melt from the extruder can be cooled and pelletized for ease of storage, handling, and transportation. The oligomers removed from the polymer syrup can be reintroduced to the feed stream providing the reactant mixture. The addition of these oligomers to the reaction system affords a polymer product having reduced oligomers. In one aspect, the addition of AMS and/or AN oligomers to the reactant mixture for polymerization can reduce the formation of new oligomers by up to 100%. For example, in a reactant mixture where 1 part by weight of oligomers has been added to the polymerization reactant mixture, the resultant polymer can comprise 1 wt. % of newly formed oligomers. This value can be significantly lower than a comparable reactant mixture differing only in that no oligomers were added to the reactant mixture but 1.8 wt. % of newly formed oligomers were formed. In a further example, where the reactant mixture has 2 parts by weight of added oligomers, the resultant polymer syrup can comprise 0.3 wt. % of newly formed oligomers.

In a further aspect, a modification of the ratio of monomers in the reactant mixture can also reduce the amount of oligomers formed in the resultant polymer. As noted herein, to prepare AMSAN, the copolymerizable monomers can comprise alpha-methyl styrene (AMS) and acrylonitrile (AN). In some aspects, the methods of the present disclosure can comprise a mixture of AMS and AN wherein the ratio of AMS to AN is azeotropic, corresponding to a weight ratio of 70:30. In further aspects however, the ratio of monomers can be shifted from azeotropic to an amount from 3:1 to 2:1 to provide a polymerization process wherein the amount of formed oligomers is reduced. In an example, where the AMS:AN weight ratio is 71.5:28.5, the amount of newly formed oligomers can be 1.5 wt. %. In yet further aspects, where the ratio of monomers is shifted to an amount from 3:1 to 2:1 in the presence of oligomers, the amount of formed oligomers can be further reduced. As an example, where the AMS:AN weight ratio is 71.5:28.5 and 1 part by weight of oligomers is introduced to the reactant mixture, the amount of newly formed oligomers can be 0.7 wt. %. As a further example, where the AMS:AN weight ratio is 71.5:28.5 and 2 parts by weight of oligomers are introduced to the reactant mixture, the amount of newly formed oligomers can be 0 wt. %.

The bulk polymerization process described herein can be used to prepare a desired resin copolymer. In one aspect, an AMSAN copolymer with reduced oligomers can be achieved according to the methods of the present disclosure. In yet further aspects, an AMSAN copolymer having a high heat performance and good flow can be prepared according to the bulk polymerization methods described herein. For example, a high heat, good flow AMSAN copolymer resin can be prepared via a continuous bulk polymerization with a conversion rate of 60% to 70% to polymeric material. In a further example, the conversion rate to AMSAN copolymer can be achieved according to the bulk polymerization process described herein with a residual monomer byproduct of less than and less than 2000 ppm and no emulsifiers or inorganic salt impurities.

In various aspects, the methods herein disclose a polymerization process for a high heat performance AMSAN copolymer with reduced oligomer content. As disclosed herein, high heat can refer to a glass transition temperature of greater than 115° C.

The isolated polymer product may have a glass transition temperature (Tg) of from 115° C. to 130° C. when measured according to ASTM D7426.

The invention further in an embodiment relates to a polymer resin prepared according to the method of the present invention. Also, in another embodiment, the invention relates to an article formed from the polymer resin prepared according to the method of the present invention.

In further aspects, the present disclosure relates to methods of reducing the amount of oligomers generated during a bulk polymerization process in the preparation of an AMSAN copolymer. The methods disclosed herein can also be appropriate for reducing the oligomers formed during other types of polymerization, such as, for example, solution polymerization.

Before the present methods and systems are disclosed and described, it is to be understood that the methods and systems are not limited to specific components or to particular compositions. It is also to be understood that the terminology used herein is for the purpose of describing particular embodiments only and is not intended to be limiting.

EXAMPLES

Detailed embodiments of the present disclosure are disclosed herein; it is to be understood that the disclosed embodiments are merely exemplary of the disclosure that may be embodied in various forms. Therefore, specific structural and functional details disclosed herein are not to be interpreted as limits, but merely as a basis for teaching one skilled in the art to employ the present disclosure. The specific examples below will enable the disclosure to be better understood. However, they are given merely by way of guidance and do not imply any limitation.

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, free-radical initiators, temperatures, pressures and other reaction ranges and conditions that can be used to optimize the product purity and yield obtained from the described process. Only reasonable and routine experimentation will be required to optimize such process conditions.

The materials shown in Table 1 were used to prepare the compositions described and evaluated herein.

| Component | Description | Source |
|---|---|---|
| AMS | Alpha-methyl styrene (monomer) | Honeywell |
| AN | Acrylonitrile (monomer) | Ineos |
| PO | 1,1-di(tert-butylperoxy)cyclohexane (radical initiator) | Akzo Nobel |

A vessel (75.7 l (20 gallons)) is charged with 70 parts by weight of alpha-methyl styrene, and 30 parts by weight of acrylonitrile to provide a reactant mixture. The contents of the vessel were mixed by agitation for 5 minutes. A feed stream of the reactant mixture with a separate stream of 0.05 parts by weight of 1,1-di(tert-butylperoxy)cyclohexane were charged at a rate of 0.8 kg/hr total into a jacketed continuous stirred-tank reactor having a capacity of 3.5 kg liquid volume occupied. The temperature of the reactor was raised to and maintained at 121° C. Heating of the reactant mixture afforded a thick polymer syrup. The polymer syrup was pumped out of the reactor through a reactor outlet at a rate of 0.8 kg/hr, equivalent to the rate of the reactant mixture feed stream. The volume of the reactor was maintained by the constant addition of reactant mixture and removal of polymer syrup. The residence time of the reactor was 4.4 hours. A final resin product was obtained from the polymer syrup after volatiles were removed by a 2.54 cm (1 inch) diameter twin screw co-rotating intermeshing extruder devolatilizer equipped with three vents under vacuum atmosphere, where the first vent is at 93.3 kPa (700 mmHg), the second one is at 26.7 kPa (200 mmHg) and the third one is at 1.3 kPa (10 mmHg) pressures. The extruder temperature is controlled by electric heating with 8 zones temperatures set at 193° C., 199° C., 199° C., 199° C., 199° C., 199° C., 215° C., 215° C. The screw speed is at 900 rpm.

A sample of the polymer syrup at 20 grams was obtained at the reactor outlet prior to pumping through a short pipe to an extruder under a vacuum atmosphere and equipped with three vents. Unreacted monomers were removed by the extruder devolatizer as described above. The copolymer melts were then cooled and strand cut into pellets.

A comparative sample (CS) contained no AMS/AN oligomers as described above. A Sample 1 was prepared by introducing 1 part by weight oligomers to the feeding stream of the reactant mixture. Another sample, Sample 2 (S2) was prepared by introducing 2 parts by weight of oligomers into the reactant mixture. For a third sample, Sample 3 (S3) the ratio of AMS to AN was altered. Here, 71.5 parts by weight of AMS and 28.5 parts by weight of AN were used in the reactant mixture instead of the 70 parts by weight of AMS and 30 parts by weight of AN used in CS. Oligomers were not added to the reactant mixture. For Sample 4 (S4), 71.5 parts by weight of AMS and 28.5 parts by weight of AN were used in the reactant mixture and 1 part by weight of oligomers were added. For Sample 5 (S5) 71.5 parts by weight of AMS and 28.5 parts by weight of AN were used in the reactant mixture and 2 parts by weight of oligomers were added.

Specimens were obtained and assessed for each sample CS and S1-S6 at the reactor outlet of the reactor system. Each specimen was analyzed using gas chromatography-mass spectrometry (GC-MS) instrumentation (Agilent Technologies 6890N Network GC coupled with 5973 Network Mass Selective Detector) to determine the quantity of oligomers formed during the polymerization process. A percent conversion of each specimen was also obtained using evaporation under heat at 71° C. in an open dish with air sweep till consistent weight was obtained.

A calibration standard containing oligomers in an amount of less than 500 g/mol (500 Daltons) was used for oligomer quantification with GC-MS. The quantity of oligomers of the calibration standard was measured using gel permeation chromatography.

The glass transition temperature (Tg) of the obtained resin product was assessed using a differential scanning calorimeter (DSC) under a nitrogen atmosphere according to ASTM D7426.

Table 2 presents the values for percent conversion, the glass transition temperature of the resulting polymer, the amount of oligomers in the reactant mixture, and the percent of newly formed oligomers for each specimen CS and S1-S5.

TABLE 2

| Oligomers formed for different samples. | | | | | | |
|---|---|---|---|---|---|---|
| | CS | S1 | S2 | S3 | S4 | S5 |
| Mixed Raw Material (parts by weight) | | | | | | |
| Acrylonitrile | 30 | 30 | 30 | 28.5 | 28.5 | 28.5 |
| α-Methyl Styrene | 70 | 70 | 70 | 71.5 | 71.5 | 71.5 |
| 1,1-Di(tert-butylperoxy)cyclohexane | 0.05 | 0.05 | 0.05 | 0.05 | 0.05 | 0.05 |
| Oligomers (parts per hundred monomers) | — | 1 | 2 | — | 1 | 2 |

TABLE 2-continued

Oligomers formed for different samples.

|  | CS | S1 | S2 | S3 | S4 | S5 |
|---|---|---|---|---|---|---|
| Process Condition | | | | | | |
| Reaction Temperature (° C.) | 121 | 121 | 121 | 121 | 121 | 121 |
| Residence Time in Reactor (hr) | 4.4 | 4.4 | 4.4 | 4.4 | 4.4 | 4.4 |
| Feed Rate (kg/hr) | 0.8 | 0.8 | 0.8 | 0.8 | 0.8 | 0.8 |
| Final Product | | | | | | |
| Conversion (%) | 64 | 64 | 64 | 63 | 61 | 61 |
| Glass Transition Temperature (° C.) | 118 | 120 | 119 | 120 | 118 | 118 |
| Oligomers in Reaction Mixture (%) | 1.8 | 2 | 2.3 | 1.5 | 1.7 | 2 |
| Newly formed oligomers (%) | 1.8 | 1 | 0.3 | 1.5 | 0.7 | 0 |

For CS, where there were no oligomers added to the reactant mixture, 1.8 wt. % oligomers were present in the resultant polymer syrup. This indicates that 1.8 wt. % of oligomers were formed during polymerization. The overall percent conversion of the reactant mixture was 64%. The Tg of the isolated resin polymer was 118° C.

For S1, where 1.0% of oligomers were introduced to the reactant mixture, the amount of oligomers present in the resultant polymer syrup was 2.0%. This indicated that 1.0% of new oligomers were formed during the polymerization process. The Tg of the isolated resin polymer increased to 120° C. compared to CS.

In S2, the amount of oligomers added to the reactant mixture was increased to 2 wt %. Here, the amount of oligomers present in the resultant polymer syrup was 2.3 wt Thus, the amount of newly formed oligomers is 0.3 wt %. The value is significantly lower than both CS and S1. The Tg increased to 119° C. when compared to CS (118° C.).

Samples 3-5 contained an off-azeotropic ratio of AMS to AN, 71.5 to 28.5. In S3, where no oligomers were introduced to the reactant mixture, the amount of oligomers in the polymer syrup was measured at 1.5 wt. %. This value is lower than that observed for CS (1.8 wt. % oligomers formed) where the AMS:AN ratio was maintained at 70:30. The results indicated that the altered AMS:AN ratio reduced the amount of oligomers produced. The Tg of the resin polymer was 120° C. In S4, oligomers were also added to the reactant mixture at 1 part by weight of the total reactant mixture. The amount of oligomers present in the resultant polymer syrup was 1.7 wt. %, corresponding to 0.7 wt. % newly formed oligomers. The Tg of the resin polymer was 118° C. For S5, where 2 wt % of oligomers were added to the reactant mixture, the polymer syrup contained 2.0 wt. % of oligomers indicating that no new oligomers were formed during the polymerization process. The Tg of the resin polymer was 118° C.

Thus, by comparison of S1 and S2 with CS, it may be understood that the introduction of a certain quantity of byproduct from a polymerization process for a copolymer resin to a reactant mixture for that polymerization process can reduce the total quantity of oligomers formed during the polymerization process, in particular in the case that the byproducts are oligomers, more in particular where the oligomers are introduced in a quantity of 0.01 to 5 wt %, with regard to the total weight of the reactant mixture.

Furthermore, by comparison of S4 with S1 and S5 with S2, respectively, it may be understood that a further reduction of oligomer formation in the polymerization reaction may be achieved by ensuring that the weight ratio of alpha-methylstyrene to acrylonitrile is from 2.34 to 3.00, such that the ratio is above azeotropic.

The examples presented herein suggested that the introduction of oligomers to the reactant mixture can decrease the amount of oligomers formed during the polymerization process. It is noted that the total amount of oligomers in the reaction remains nearly the same regardless of whether pre-formed oligomers are added to the reaction mixture or not. However, the addition of pre-formed oligomers to the reactant mixture reduces the amount of newly formed oligomers, and enables the usage of pre-formed oligomers to improve the overall yield of the reaction.

In various aspects, the present disclosure pertains to and includes at least the following aspects.

Aspect 1. A method comprising: isolating a byproduct formed during a polymerization process for a copolymer resin; and introducing the byproduct formed during the polymerization process to a reactant mixture of reagents for the polymerization process, wherein the introduction of the byproduct into a reactant mixture of the polymerization process reduces the amount of a newly formed byproduct in a polymer product of the polymerization process.

Aspect 2. The method of aspect 1, wherein the polymerization process is a bulk or solution polymerization process.

Aspect 3. The method of aspect 1 or 2, wherein the byproduct comprises monomers removed from the polymerization process and condensed by cooling.

Aspect 4. The method of any of aspects 1-3, wherein the during the polymerization process comprises an alpha-methylstyrene production process and the byproduct comprises oligomer byproducts from the alpha-methylstyrene production process.

Aspect 5. The method of any of aspects 1-4, wherein the polymerization process comprises a polymerization process and a copolymerization process, the copolymerization process configured to reduce a quantity of byproducts produced in the polymerization process.

Aspect 6. The method of any of aspects 1-5, further comprising introducing a solvent to the polymerization process, wherein the introduction of the solvent into a reactant mixture of the polymerization process reduces the amount of a newly formed byproduct in the polymer product of the polymerization process.

Aspect 7. A method comprising: introducing a reactant mixture into a first vessel of a polymerization system, the reactant mixture comprising: from 58 wt. % to 75 wt. % of alpha-methylstyrene, from 23 wt. % to 35 wt. % of acrylonitrile, wherein a ratio of alpha-methylstyrene and acrylonitrile is from greater than 70:30 to 3:1 or between 70:30 and less than 2:1, from 0.01 wt. % to 5 wt. % of alpha methylstyrene and alpha methylstyrene-acrylonitrile oligomers, and from 0.01 wt. % to 0.5 wt. % of a free radical initiator, wherein the combined weight percent value of all components of the reactant mixture does not exceed 100 wt. %, and wherein all weight percent values are based on the total weight of the reactant mixture; transferring the reactant mixture to a first reactor of the polymerization system; heating the reactant mixture to a temperature of from 110° C. to 135° C. for a residence time of from 3 hours to 5 hours to form a polymer syrup, wherein the amount of alpha-methylstyrene and alpha-methylstyrene-acrylonitrile oligomers formed in the polymer syrup is 60% less than a comparative polymer syrup formed from a reactant mixture having i, ii, and iv and in the absence of iii; and directing the polymer syrup to at least a second reactor for isolation of a polymer product.

Aspect 8. A polymerization method comprising: charging a reactor vessel with a feedstream of from 58 wt. % to 75 wt. % of a monovinyl aromatic monomer, from 23 wt. % to 35 wt. % of a co-polymerizable monomer, from 0.01 wt. % to 5 wt. % of oligomers, and from 0.01 wt. % to 2 wt. % of a di-functional organic peroxide for a residence time of from 3 hours to 5 hours at a temperature of from 110° C. to 135° C. to provide a polymer syrup, wherein the polymer syrup comprises polymer, oligomer, and unpolymerized monomer; withdrawing the polymer syrup from the first reactor at a rate equivalent to that of charging the feedstream into the first reactor such the total volume of the reactor vessel at any instant is constant; directing the polymer syrup to an external vessel; subjecting the polymer syrup to vacuum pressure and heat to extract volatile organic compounds, oligomers, and unpolymerized monomers from the polymer syrup to form an isolated polymer product; and introducing the oligomers extracted to the charging feed stream of the first reactor.

Aspect 9. The method of aspect 8, wherein the oligomers present in reactant mixture comprise oligomers formed during polymerization and oligomers added to the reactor feed stream.

Aspect 10. The method of any of aspects 8-9, wherein the oligomers formed is less than 1 wt. % of the weight of the polymer syrup.

Aspect 11. The method of any of aspects 8-10, wherein the monovinylic aromatic monomer is alpha-methylstyrene.

Aspect 12. The method of any of aspects 8-11, wherein the co-polymerizable monomer is acrylonitrile.

Aspect 13. The method of any of aspects 8-12, wherein the free radical initiator comprises 1,1-di(tert-butylperoxy)cyclohexane.

Aspect 14. The method of any of aspects 8-13, wherein the external vessel comprises a devolatilization extruder or flash chamber.

Aspect 15. The method of any of aspects 8-14, wherein the oligomers comprise oligomers of alpha-methylstyrene and alpha-methylstyrene-acrylonitrile.

Aspect 16. The method of any of aspects 8-15, wherein a weight ratio of the amount of monovinylic aromatic monomer to co-polymerizable monomer is an adjusted azeotropic ratio of from greater than 70:30 to 3:1 or between 70:30 and less than 2:1.

Aspect 17. The method of any of aspects 8-16, wherein a percent conversion to polymeric material for the polymerization process is at least 50%.

Aspect 18. The method of any of aspects 8-17, wherein the isolated polymer product has a glass transition temperature (Tg) of from 115° C. to 130° C. when measured according to ASTM D7426.

Aspect 19. A polymer resin prepared according to the method of any one of aspects 1-18.

Aspect 20. An article formed from the polymer resin prepared according to the method of aspect 19.

While aspects of the present disclosure can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

As used in the specification and the appended claims, the singular forms "a," "an" and "the" include plural referents unless the context clearly dictates otherwise. Thus, for example, reference to "a monomer" can include mixtures of two or more such monomers. Furthermore, for example, reference to an oligomer can include a mixture of two or more such oligomers.

As used in the specification and the appended claims, the singular forms "a," "an" and "the" include plural referents unless the context clearly dictates otherwise. Thus, for example, reference to "a monomer" can include mixtures of two or more such monomers.

As used herein, the terms "Glass Transition Temperature" or "Tg" refer to the maximum temperature at which a polymer will still have one or more useful properties. These properties include heat distortion temperature (HDT), impact resistance, stiffness, strength, and shape retention. The Tg therefore may be an indicator of its useful upper temperature limit, particularly in plastics applications. The Tg can be measured using a differential scanning calorimetry method and expressed in degrees Celsius (° C.). In various aspects, a higher Tg can correspond to a more heat resistant composition.

Emulsion polymerization, as used herein, refers to a process of radical polymerization wherein reagents are combined in an aqueous phase containing a surfactant and the desired polymer can be isolated from the resultant heterogeneous solution. Emulsion polymerization reagents can typically comprise copolymerizable monomer, water (or an appropriate solvent), a radical initiator, a chain-transfer agent and a surfactant or emulsifying aid to provide a latex, or a colloidal dispersion of polymer molecules throughout an aqueous medium.

Bulk polymerization, as used herein, refers to a radical polymerization process wherein copolymerizable monomers in liquid (or gaseous) state and a soluble radical initiator are combined. The polymerization process can proceed in the absence of any medium other than a catalyst or reaction accelerator.

Continuous polymerization, as used herein, refers to the rate of polymerization in a polymerization reactor system. In one aspect, a polymerization system can comprise a single vessel, or reactor, in which polymerization occurs. In further aspects, a polymerization system can comprise a series of reactors within which polymerization occurs. A continuous polymerization is achieved where the rate of the introduction of the feedstream into a reactor is the same as the rate of removal. In other words, in the continuous process, the polymerization system is continuously fed to and removed from a suitable reactor at a rate such that the total volume of the polymerization system at any instant remains unchanged.

Copolymerizable monomers, as used herein, refer to dissimilar monomers capable of polymerizing into oligomers or larger copolymer molecules owing to carbon to carbon unsaturation present in the monomers. Copolymerizable monomers can include dissimilar functional group-containing vinyl monomers and polyfunctional vinyl monomer.

As used herein, the terms "optional" or "optionally" mean that the subsequently described event, condition, component, or circumstance may or may not occur, and that the description includes instances where said event or circumstance occurs and instances where it does not.

References in the specification and concluding claims to parts by weight, of a particular element or component in a composition or article denotes the weight relationship between the element or component and any other elements or components in the composition or article for which a part by weight is expressed. Thus, in a composition containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

Compounds disclosed herein are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this disclosure belongs.

The invention claimed is:

1. A method comprising:
    isolating a byproduct formed during a polymerization process for a copolymer resin; and
    introducing the byproduct formed during the polymerization process to a reactant mixture of reagents for the polymerization process,
        wherein the introduction of the byproduct into a reactant mixture of the polymerization process reduces the amount of a newly formed byproduct in a polymer product of the polymerization process and wherein the polymerization process is a process for the production of a copolymer of alpha-methylstyrene and acrylonitrile, and wherein the byproduct is an oligomer composition separated from the polymerization process.

2. Method according to claim 1, comprising:
    introducing a reactant mixture into a mixing vessel of a polymerization system, the reactant mixture comprising:
        i. from 58 wt. % to 75 wt. % of alpha-methylstyrene;
        ii. from 23 wt. % to 35 wt. % of acrylonitrile, wherein the ratio of alpha-methylstyrene and acrylonitrile is ≥2.0 and ≤3.0;
        iii. from 0.01 wt. % to 5 wt. % of alpha methylstyrene and alpha methylstyrene-acrylonitrile oligomers; and
        iv. from 0.01 wt. % to 2.0 wt. % of a free radical initiator, wherein the combined weight percent value of all components of the reactant mixture does not exceed 100 wt. %, and wherein all weight percent values are based on the total weight of the reactant mixture;
    transferring the reactant mixture to a first reactor of the polymerization system;
    heating the reactant mixture to a temperature of from 100° C. to 145° C. for a residence time of from 2 hours to 6 hours to form a polymer syrup; and
    directing the polymer syrup to at least a second reactor for isolation of a polymer product.

3. Method according to claim 2, wherein the reactant mixture is heated to a temperature of from 110° C. to 135° C. for a residence time of from 3 hours to 5 hours to form a polymer syrup.

4. Method according to claim 2, wherein the amount of alpha-methylstyrene and alpha-methylstyrene-acrylonitrile oligomers formed in the polymer syrup is 60% less than a comparative polymer syrup formed from a reactant mixture having i, ii, and iv and in the absence of iii.

5. Method according to claim 1, wherein the ratio of alpha-methylstyrene and acrylonitrile is ≥2.34 and ≤3.0, wherein the ratio is the weight ratio.

6. Method according to claim 1, wherein the oligomers have a molecular weight of less than 500 g/mol.

7. A method comprising:
    charging a reactor vessel with a feedstream of from 58 wt. % to 75 wt. % of a monovinyl aromatic monomer, from 23 wt. % to 35 wt. % of a co-polymerizable monomer, from 0.01 wt. % to 5 wt. % of oligomers, and from 0.01 wt. % to 2.0 wt. % of a di-functional organic peroxide as free-radical initiator for a residence time of from 3 hours to 5 hours at a temperature of from 110° C. to 135° C. to provide a polymer syrup, wherein the polymer syrup comprises polymer, oligomer composition, and unpolymerized monomer;
    withdrawing the polymer syrup from the first reactor at a rate equivalent to that of charging the feedstream into the first reactor such the total volume of the reactor vessel at any instant is constant; and
    directing the polymer syrup to an external vessel;
    isolating a byproduct from the polymer syrup; and
    introducing the byproduct to the reactor vessel, wherein the introduction of the byproduct reduces the amount of a newly formed byproduct in the polymer syrup.

8. Method according to claim 7 wherein in the external vessel the polymer syrup is subjected to vacuum pressure and heat to extract volatile organic compounds, oligomers, and unpolymerized monomers from the polymer syrup to form an isolated polymer product, and wherein the oligomers extracted are introduced to the charging feed stream of the first reactor.

9. Method according to claim 8 wherein
the pressure in at least a part of the external vessel ≤30 kPa; and
the temperature in at least a part of the external vessel is ≥180° C. and ≤250° C.

10. Method according to claim 7, wherein
the monovinylic aromatic monomer is alpha-methylstyrene;
the co-polymerizable monomer is acrylonitrile; and/or
the free radical initiator comprises 1,1-di(tert-butylperoxy)cyclohexane.

11. Method according to claim 7, wherein the external vessel comprises a devolatilization extruder or flash chamber.

12. The method of claim 7, wherein the isolated polymer byproduct has a glass transition temperature (Tg) of from 115° C. to 130° C. when measured according to ASTM D7426.

13. Method according to claim 1, comprising:
introducing a reactant mixture into a mixing vessel of a polymerization system, the reactant mixture comprising:
  i. from 58 wt. % to 75 wt. % of alpha-methylstyrene;
  ii. from 23 wt . % to 35 wt. % of acrylonitrile, wherein the ratio of alpha-methylstyrene and acrylonitrile is ≥2.34 and ≤3.0, wherein the ratio is the weight ratio;
  iii. from 0.01 wt. % to 5 wt. % of alpha methylstyrene and alpha methylstyrene-acrylonitrile oligomers, wherein the oligomers have a molecular weight of less than 500 g/mol; and
  iv. from 0.01 wt. % to 2.0 wt. % of a free radical initiator, wherein the combined weight percent value of all components of the reactant mixture does not exceed 100 wt. %, and wherein all weight percent values are based on the total weight of the reactant mixture;
transferring the reactant mixture to a first reactor of the polymerization system;
heating the reactant mixture to a temperature of from 100° C. to 145° C. for a residence time of from 2 hours to 6 hours to form a polymer syrup; and
directing the polymer syrup to at least a second reactor for isolation of a polymer product.

14. Method according to claim 13, wherein the method comprises:
charging a reactor vessel with a feedstream of from 58 wt. % to 75 wt. % of a monovinyl aromatic monomer, from 23 wt. % to 35 wt. % of a co-polymerizable monomer, from 0.01 wt. % to 5 wt. % of oligomers, and from 0.01 wt. % to 2.0 wt. % of a di-functional organic peroxide as free-radical initiator for a residence time of from 3 hours to 5 hours at a temperature of from 110° C. to 135° C. to provide a polymer syrup, wherein the polymer syrup comprises polymer, oligomer, and unpolymerized monomer;
withdrawing the polymer syrup from the first reactor at a rate equivalent to that of charging the feedstream into the first reactor such the total volume of the reactor vessel at any instant is constant; and
directing the polymer syrup to an external vessel.

15. Method according to claim 10, wherein
the monovinylic aromatic monomer is alpha-methylstyrene; and
the co-polymerizable monomer is acrylonitrile.

* * * * *